(12) United States Patent
Yang et al.

(10) Patent No.: US 8,917,242 B2
(45) Date of Patent: Dec. 23, 2014

(54) COMPUTER WITH AN INPUT DEVICE HAVING A LABELED REGION

(75) Inventors: Tsun-Chih Yang, New Taipei (TW); Hao-Sheng Lo, New Taipei (TW)

(73) Assignee: Acer Incorporated, New Taipei (TW)

( * ) Notice: Subject to any disclaimer, the term of this patent is extended or adjusted under 35 U.S.C. 154(b) by 231 days.

(21) Appl. No.: 13/541,753

(22) Filed: Jul. 4, 2012

(65) Prior Publication Data

US 2013/0009876 A1 Jan. 10, 2013

(30) Foreign Application Priority Data

Jul. 6, 2011 (TW) .............................. 100212362 U (51) Int. Cl.
*G09G 5/00* (2006.01)
*G06F 1/16* (2006.01)
*G06F 3/0488* (2013.01)

(52) U.S. Cl.
CPC .......... *G06F 1/1662* (2013.01); *G06F 3/04886* (2013.01); *G06F 2203/04809* (2013.01)
USPC ........... 345/168; 345/169; 345/170; 345/171; 345/172

(58) Field of Classification Search
CPC .. G06F 3/0213; G06F 3/0219; G06F 3/04886
USPC ............ 345/156–184; 361/679.3; 463/37, 46, 463/47; 715/788, 841
See application file for complete search history.

(56) References Cited

U.S. PATENT DOCUMENTS

| | | | | |
|---|---|---|---|---|
| 5,931,297 | A | * | 8/1999 | Weill et al. ..................... 206/320 |
| 6,050,825 | A | * | 4/2000 | Nichol et al. ................. 434/227 |
| 6,728,555 | B1 | * | 4/2004 | Pirila et al. ..................... 455/566 |
| 6,752,631 | B2 | * | 6/2004 | Schwarzkopf ................ 434/227 |
| 6,757,157 | B2 | * | 6/2004 | Lammintaus et al. ...... 361/679.3 |
| 7,659,887 | B2 | * | 2/2010 | Larsen et al. ................. 345/170 |
| 8,537,119 | B1 | * | 9/2013 | Grivna et al. ................. 345/169 |
| 2003/0235452 | A1 | * | 12/2003 | Kraus et al. ................... 400/472 |
| 2004/0212598 | A1 | * | 10/2004 | Kraus et al. ................... 345/168 |
| 2005/0099403 | A1 | * | 5/2005 | Kraus et al. ................... 345/173 |
| 2006/0181515 | A1 | * | 8/2006 | Fletcher et al. ............... 345/173 |
| 2007/0105604 | A1 | * | 5/2007 | Choo et al. ................. 455/575.3 |
| 2007/0200823 | A1 | * | 8/2007 | Bytheway et al. ............ 345/160 |
| 2007/0279385 | A1 | * | 12/2007 | Woolley et al. ............... 345/168 |
| 2010/0026626 | A1 | * | 2/2010 | Macfarlane ................... 345/160 |
| 2010/0099463 | A1 | * | 4/2010 | Kim et al. ..................... 455/566 |
| 2010/0134420 | A1 | * | 6/2010 | Gluckstad ..................... 345/172 |
| 2011/0141052 | A1 | * | 6/2011 | Bernstein et al. ............. 345/174 |
| 2011/0191516 | A1 | * | 8/2011 | Xiong et al. .................. 710/305 |
| 2012/0023401 | A1 | * | 1/2012 | Arscott et al. ................ 715/702 |

* cited by examiner

*Primary Examiner* — Prabodh M Dharia
(74) *Attorney, Agent, or Firm* — Jianq Chyun IP Office (57) ABSTRACT

A computer with an input device having a labeled region including a host, a first monitor, a first touchpad and a cover is provided. The first monitor is electrically connected to the host and serves as a display media of the host. The first touchpad is electrically connected to the host and serves as an input media of the host. The first touchpad includes a touch keypad region, wherein a plurality of touch keys is disposed in the touch keypad region. The cover encloses the first touchpad and includes a labeled region. When the device is power on, the labeled region is corresponding to the touch keypad region of the first touchpad, and the user can distinguish positions of each of the touch keys of the touch keypad region when inputting data by means of the touch keypad region.

12 Claims, 11 Drawing Sheets

COMPUTER WITH AN INPUT DEVICE HAVING A LABELED REGION

CROSS-REFERENCE TO RELATED APPLICATION

This application claims the priority benefit of Taiwan application serial no. 100212362, filed on Jul. 6, 2011. The entirety of the above-mentioned patent application is hereby incorporated by reference herein and made a part of this specification.

TECHNICAL FIELD

The invention relates to a computer with an input device having a labeled region; and more particularly to a computer with an input device having a labeled region which allows a user to distinguish positions of each of the touch keys according to a labeled region of a cover when the user inputs data by using touch keypad region.

BACKGROUND

In present, input methods by touching are widely used in tablet PCs, and tablet PC user converts the touch screen into a data input media when the user needs to input data. In addition, users can also input data by handwriting recognition built-in tablet PCs, speech recognition, or a physical keyboard.

Compared a display keyboard to a physical keyboard, the display keyboard is built in the tablet PC, and therefore the user uses the display keyboard to input data conveniently without connecting a physical keyboard to the tablet PC.

Therefore, when the user is in the situation of frequently inputting data into the tablet PC by touching, the user has to check positions of the keys to touch of the keypad, and then the user is able to ensure the correctness of the input data. However, such practices will delay the speed of the input data and the requirements of rapid data input can not be met if the user needs to check the locations of the keys repeatedly.

Owing to the expectations of user that entering information quickly for the conventional tablet PC can not be met, Applicants are devoted to find a solution.

SUMMARY

The disclosure provides a computer with an input device having a labeled region, which speeds up the data input velocity than convention.

The computer with an input device having a labeled region allows a user to touch the physical labelled portion of the labeled region to ensure positions of the touch keys instead of checking positions of touch keys visually, and therefore the user focuses on other display screens needed to be viewed, display screen of second monitor or other display screen needed to be viewed of the first monitor when in the situation of frequently inputting data by the computer input device. In this way, velocity of data input is speeded up, and request of rapid data input by users is satisfied, too.

The computer with an input device having a labeled region further allows the user to distinguish positions of each of the touch keys of the touch keypad region by means of the labelled portions of the labeled region. A first bump is disposed in a position on the labelled portion where the position is corresponding to the specific touch key of the labelled portion which displays the character "F". A second bump is disposed in another one position on the labelled portion where the another one position is corresponding to the specific touch key of the labelled portion which displays the character "J". The first bump and the second bump may also be disposed on other labelled portions, and the user distinguishes specific touch keys by means of the first bump and the second bump rapidly.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 3 is a schematic view illustrating the computer with an input device having a labeled region of the first embodiment, wherein the device is power on.

FIG. 10 is a front view illustrating the computer with an input device having a labeled region of a third embodiment, wherein the device is power on.

FIG. 14 is a front view illustrating the computer with an input device having a labeled region of the fourth embodiment, wherein the device is power on.

FIG. 17 is a schematic view illustrating a computer with an input device having a labeled region of the fifth embodiment, wherein the device is power on.

FIG. 18 is a front view illustrating a computer with an input device having a labeled region of the fifth embodiment, wherein the device is power on.

DETAILED DESCRIPTION OF DISCLOSED EMBODIMENTS

Several exemplary embodiments accompanied with figures are described in detail below to further describe the disclosure in details. However, the disclosure is not limited thereto.

FIG. 1 to FIG. 4 are schematic view, exploded view and front view illustrating the computer with an input device having a labeled region of the first embodiment, respectively. Referring to FIGS. 1 to 4, the computer with an input device having a labeled region of the first embodiment includes a host 10, a first monitor 20, a first touchpad 30 and a cover 40. A computing unit and software are installed in the host 10. The first monitor 20 is electrically connected to the host 10, and the first monitor 20 serves as a display media of the host 10. The first touchpad 30 is electrically connected to the host 10, and the first touchpad 30 serves as an input media of the host 10. The first touchpad 30 includes a touch keypad region 31, and the touch keypad region 31 includes a plurality of touch keys 310.

The cover 40 encloses the first touchpad 30, and therefore the cover 40 provides a function of protecting the first touchpad 30. The cover 40 is transparent, and such that the cover 40 displays written characters displayed by the first monitor 20. A labeled region 41 is disposed on a surface of the cover 40, and therefore the labeled region 41 makes the surface of the cover 40 uneven. The labeled region 41 includes a plurality of labelled portions 410, and the labelled portions 410 are indentations or protrusions, or the labelled portions 410 are combination of indentations and protrusions, which makes the user have different tactile feelings when touching. A number of the labelled portions 410 is equivalent to a number of the touch keys 310, and each of the labelled portions 410 is corresponding to one of the touch keys 310. The labelled portions 410 of the present embodiment are enclosed frames, and the enclosed-frame-shaped labelled portions 410 are indentations.

When the host 10 is power on, the first monitor 20 displays written characters of the keypad, and the labelled portions 410 of the labeled region 41 are corresponding to the touch keys 310 of the touch keypad region 31 of the first touchpad 30. Each of the enclosed-frame-shaped labelled portions 410 encircles one of the touch keys 310 of the touch keypad region 31 correspondingly. A user touches the labeled region 41 of the cover 40 to further touch the touch keypad region 31 of the first touchpad 30 for inputting data by sighting on the written characters on the first monitor 20, and the labelled portions 410 of the labeled region 41 allows the user to distinguish positions of each of the touch keys 310 of the touch keypad region 31. A first bump 411 is disposed in a position S on the labelled portions 410 where the position S is corresponding to the specific touch key 310 which displays the character "F". Similarly, a second bump 412 is disposed in another position S where the another position S is corresponding to the specific touch key 310 which displays the character "J". The first bump 411 and the second bump 412 may also be disposed on other touch keys 310 analogously. The user distinguishes positions of specific touch keys 310 by means of the first bump 411 and the second bump 412 rapidly.

In the situation that the input device is used to frequent input data, the user focuses on other display screen needed to be viewed instead of checking positions of the touch keys 310 repeatedly. Specifically, the user ensures positions of the touch keys 310 by the physical labelled portions 410 of the labeled region 41. In this way, velocity of data input is speeded up, and then request of rapid data input by user is further satisfied.

The host 10, the first monitor 20, the first touchpad 30 and the cover 40 of the present embodiment can be located on an almost the same lengthwise position, wherein the first monitor 20 can be stacked on the host 10, the first touchpad 30 can be stacked on the first monitor 20, and the cover 40 can be stacked on the first touchpad 30.

Figure 1:
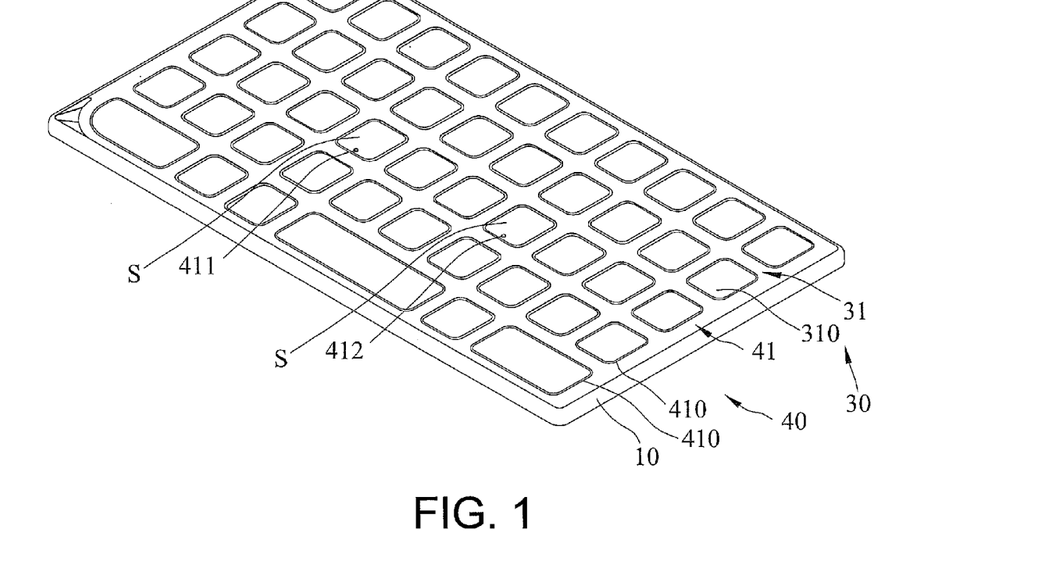
FIG. 1 is a schematic view illustrating a computer with an input device having a labeled region of a first embodiment, wherein the device is power off.
Figure 2:
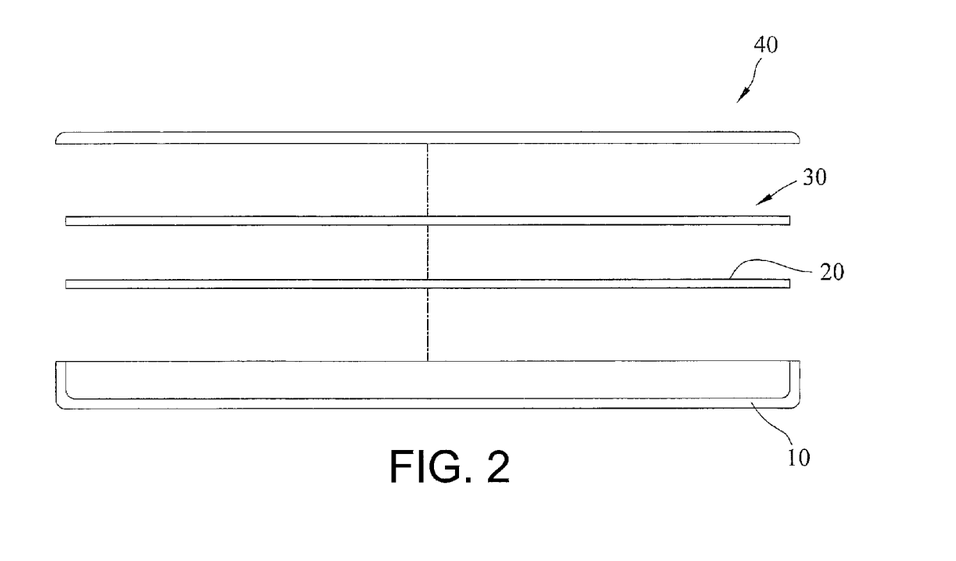
FIG. 2 is an exploded view illustrating the computer with an input device having a labeled region of the first embodiment.
Figure 3:
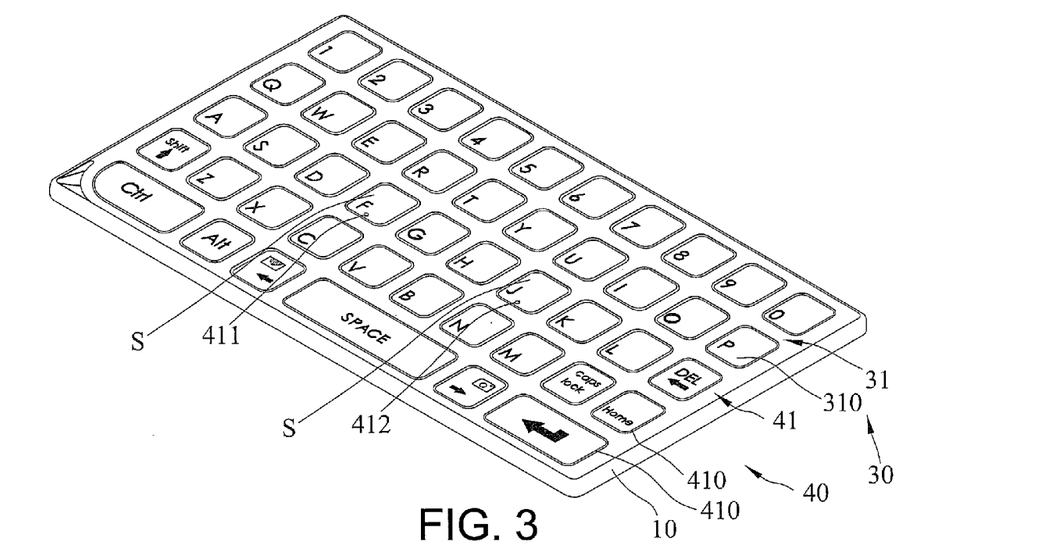
Figure 4:
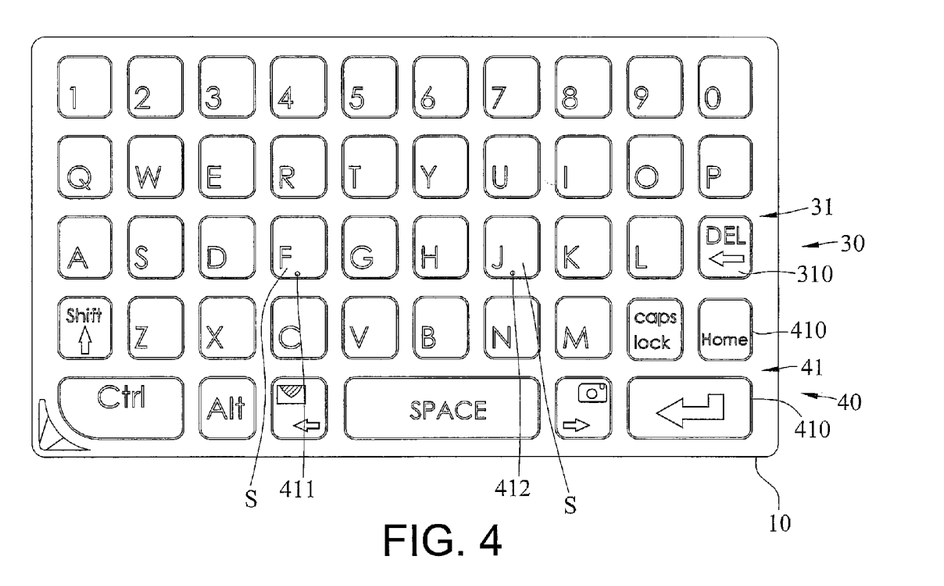
FIG. 4 is a front view of the computer with an input device having a labeled region of the first embodiment.
Figure 5:
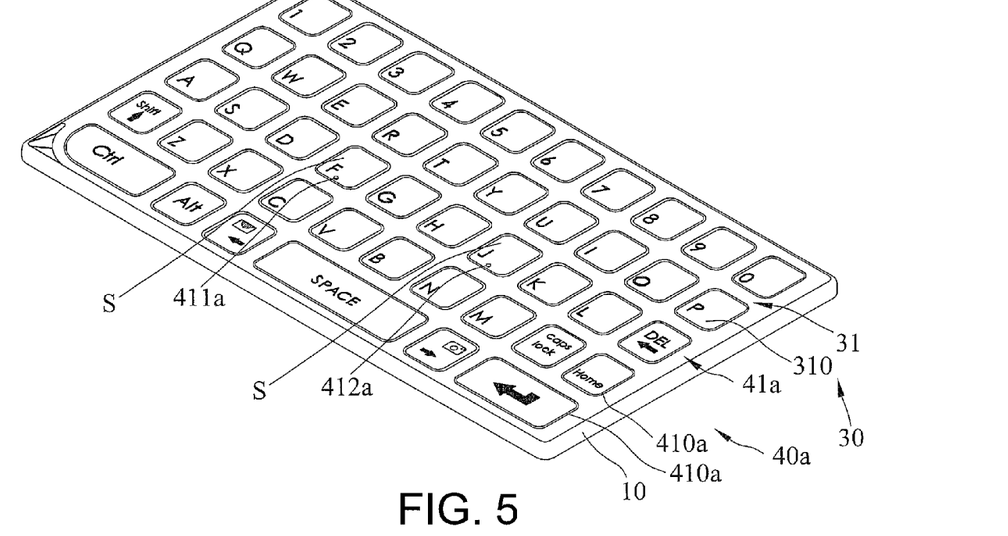
FIG. 5 is a schematic view illustrating the computer with an input device having a labeled region of a second embodiment.
Figure 6:
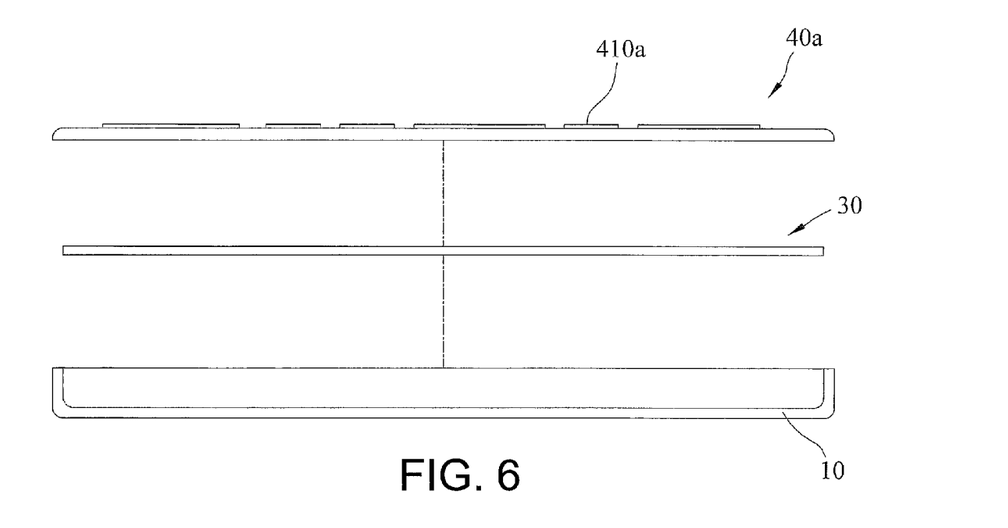
FIG. 6 is an exploded view illustrating the computer with an input device having a labeled region of the second embodiment.
Figure 7:
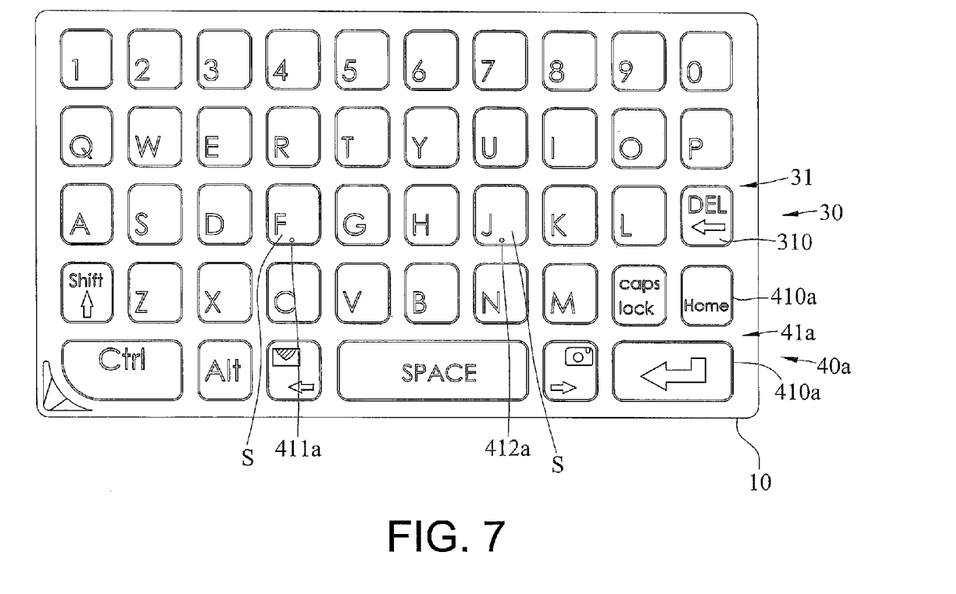
FIG. 7 is a front view of the computer with an input device having a labeled region of the second embodiment.

FIG. 5 to FIG. 7 are schematic view, exploded view and front view illustrating the computer with an input device having a labeled region of the second embodiment, respectively. Referring to FIGS. 5 to 7, the computer with an input device having a labeled region of the second embodiment includes a host 10, a first touchpad 30 and a cover 40a. A further display could be electrically connected to or lean against the host 10 of the second embodiment. The host 10 and the first touchpad 30 are equivalent to those in the first embodiment, wherein the first touchpad 30 is electrically connected to the host 10 and serves as an input media of the host 10. The first touchpad 30 includes a touch keypad region 31, and the touch keypad region 31 includes a plurality of touch keys 310.

The cover 40a encloses the first touchpad 30, and the cover 40a provides a function of protecting the first touchpad 30. The cover 40a is non-transparent, and a labeled region 41a is disposed on the surface of the cover 40a while written characters formed by print, laser engraving, intaglioing or chiseling out are set on the labeled region 41a. The labeled region 41a makes the surface of the cover 40a uneven. The labeled region 41a includes a plurality of labelled portions 410a. The labelled portions 410a are indentations, protrusions, or combination of indentations and protrusions, making the user have different tactile feelings when touching. The number of the labelled portions 410a is equivalent to the number of the touch keys 310, and each of the labelled portions 410a is corresponding to one of the touch keys 310. The labelled portions 410a of the present embodiment are enclosed frames, and the enclosed-frame-shaped labelled portions 410 are protrusions.

The labelled portions 410a of the labeled region 41a are corresponding to the touch keys 310 of the touch keypad region 31 of the first touchpad 30. Each of the enclosed-frame-shaped labelled portions 410a encircles one of the touch keys 310 of the touch keypad region 31. The user touches the labeled region 41a of the cover 40a to further touch the touch keypad region 31 of the first touchpad 30 for inputting data by focusing on the written characters of the cover 40a visually. The user distinguishes positions of each of the touch keys 310 of the touch keypad region 31 by means of the labelled portions 410a of the labeled region 41a. A first bump 411a is disposed in one of the position S on the labelled portion 410a where the position S is corresponding to the specific touch key 310 which displays the character "F". Similarly, A second bump 412a is disposed in another one position S on the labelled portion 410a where the another one position S is corresponding to the specific touch key 310 which displays the character "J". Analogously, the first bump 411a and the second bump 412a may be disposed corresponding to other touch keys 310a. The user distinguishes positions of the specific touch keys 310a by means of the first bump 411a and the second bump 412a.

In the situation that the input device is used to frequent input data, the user focuses on other display screen need to be viewed, which is the display leaning against or electrically connected to the host 10, for example, instead of checking positions of the touch keys 310 repeatedly. Specifically, the user ensures positions of the touch keys 310 by the physical labelled portions 410a of the labeled region 41a. In this way, velocity of data input is speeded up, and then request of rapid data input by user is further satisfied.

In the second embodiment, the host 10, the first touchpad 30 and the cover 40a can be located on an almost the same lengthwise position, where the cover 40a can be stacked on the first touchpad 30.

Figure 8:
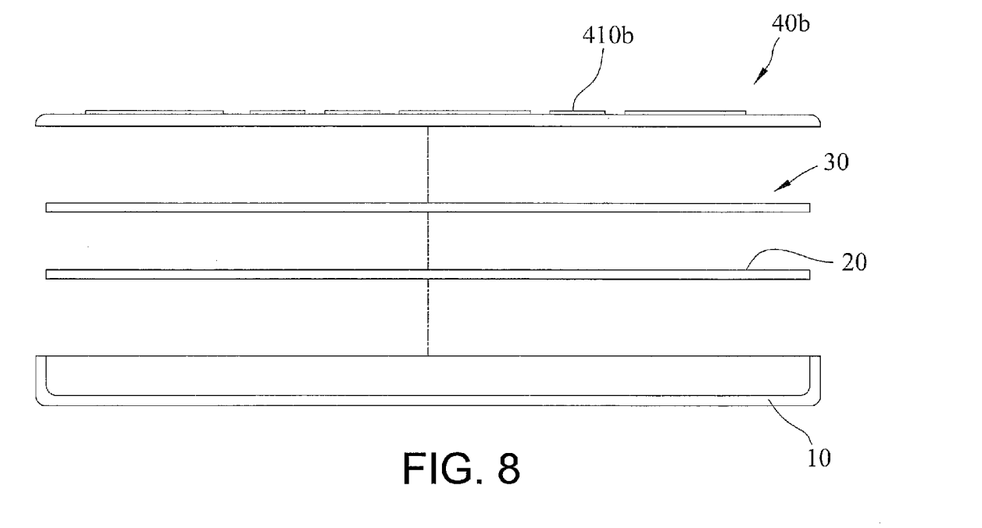
FIG. 8 is a front view illustrating the computer with an input device having a labeled region of a third embodiment, wherein the device is power off.
Figure 9:
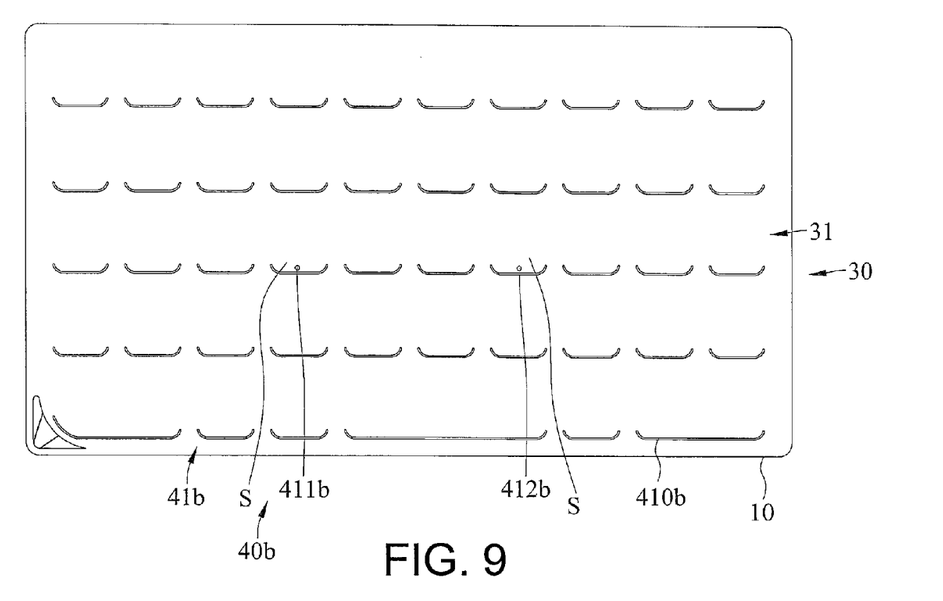
FIG. 9 is an exploded view illustrating the computer with an input device having a labeled region of the third embodiment.
Figure 10:
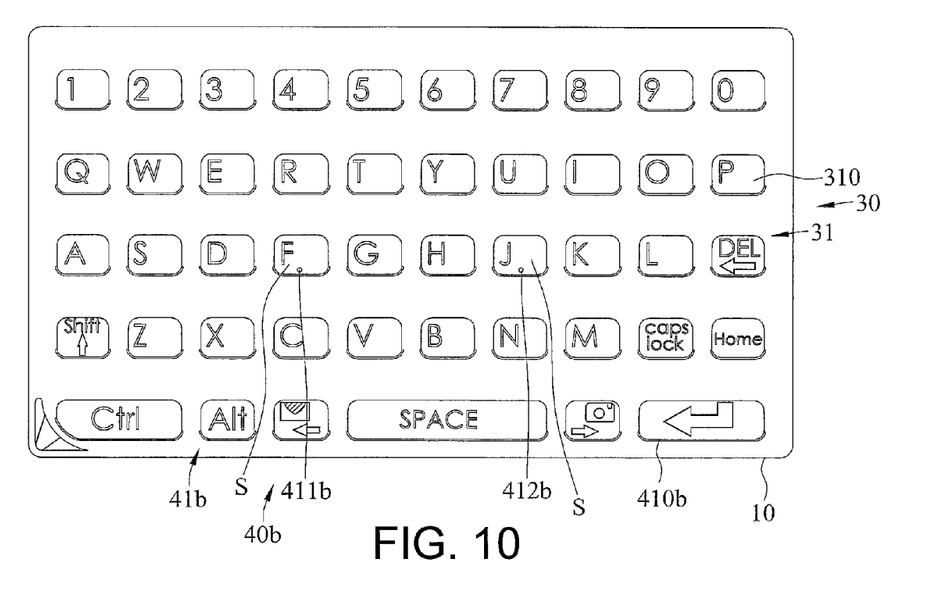
Figure 11:
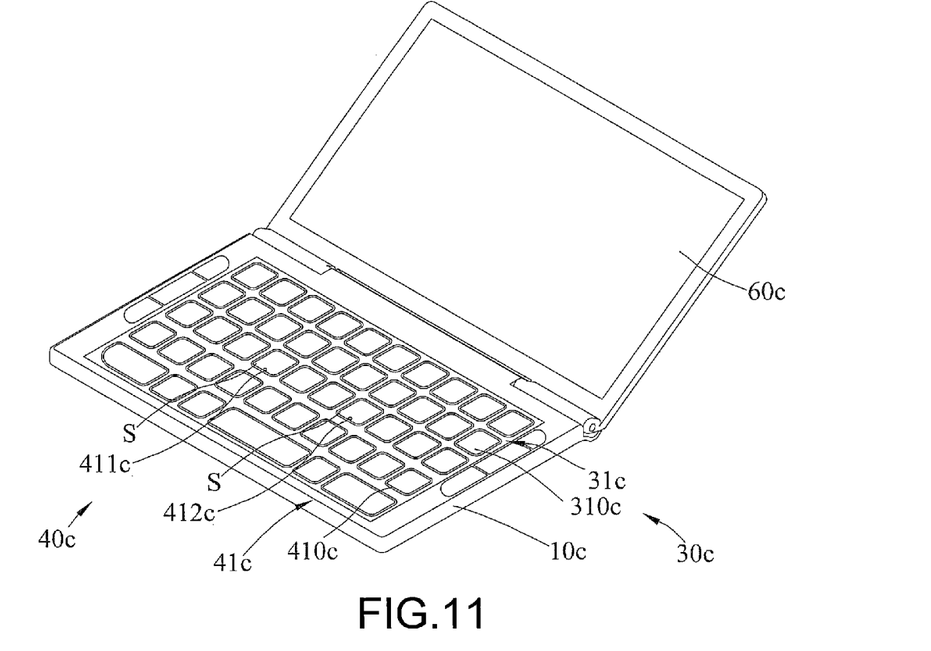
FIG. 11 is a schematic view illustrating the computer with an input device having a labeled region of a fourth embodiment, wherein the device is power off
Figure 12:
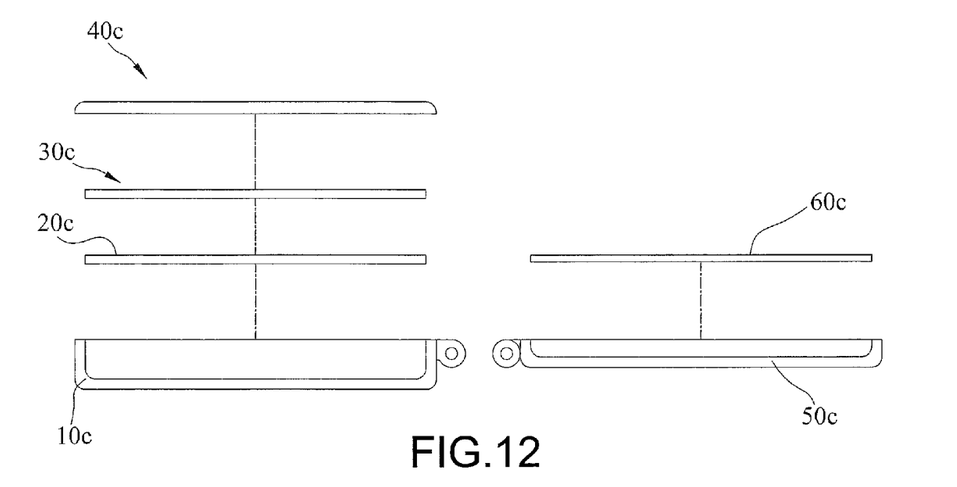
FIG. 12 is an exploded view illustrating the computer with an input device having a labeled region of the fourth embodiment.
Figure 13:
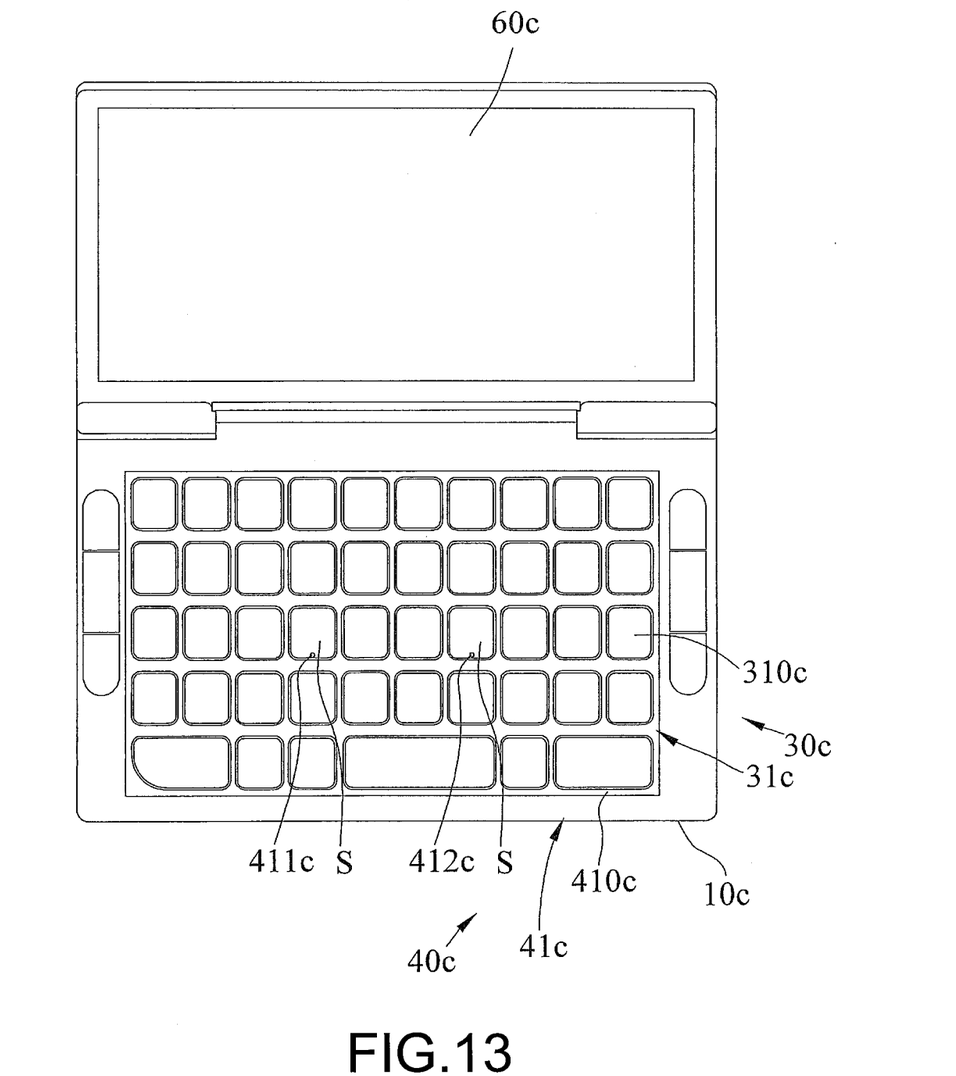
FIG. 13 is a front view illustrating the computer with an input device having a labeled region of the fourth embodiment, wherein the device is power off
Figure 14:
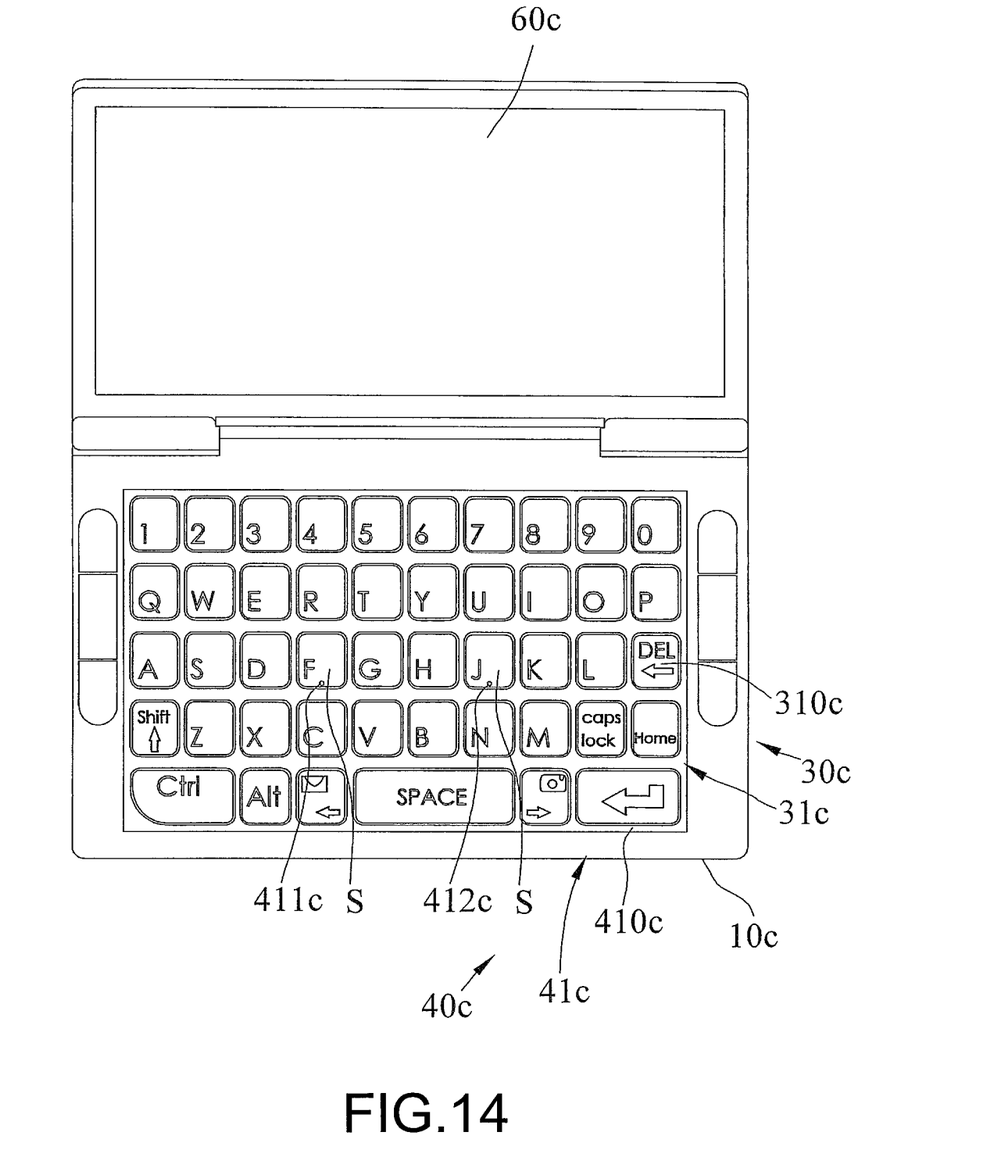
Figure 15:
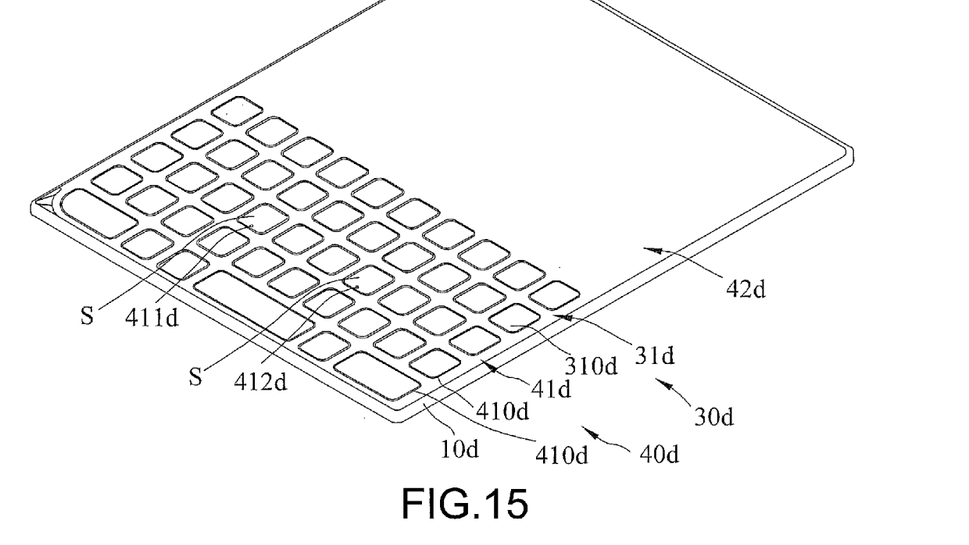
FIG. 15 is a schematic view illustrating a computer with an input device having a labeled region of a fifth embodiment, wherein the device is power off
Figure 16:
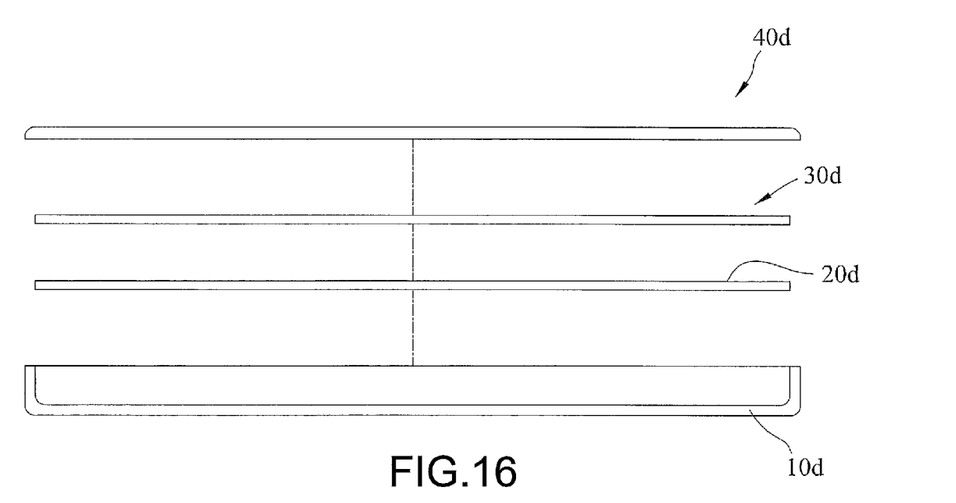
FIG. 16 is an exploded view illustrating a computer with an input device having a labeled region of the fifth embodiment.
Figure 17:
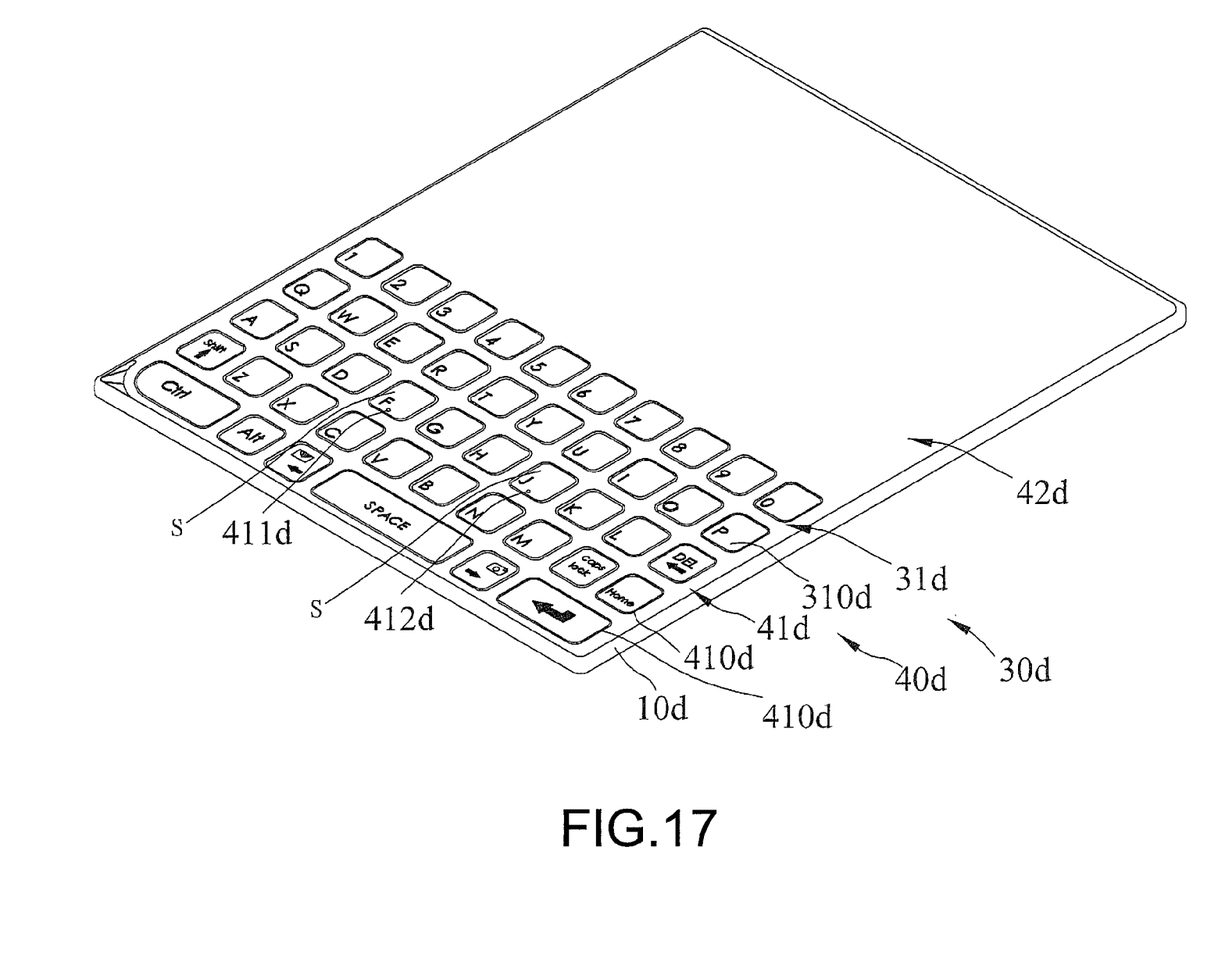
Figure 18:
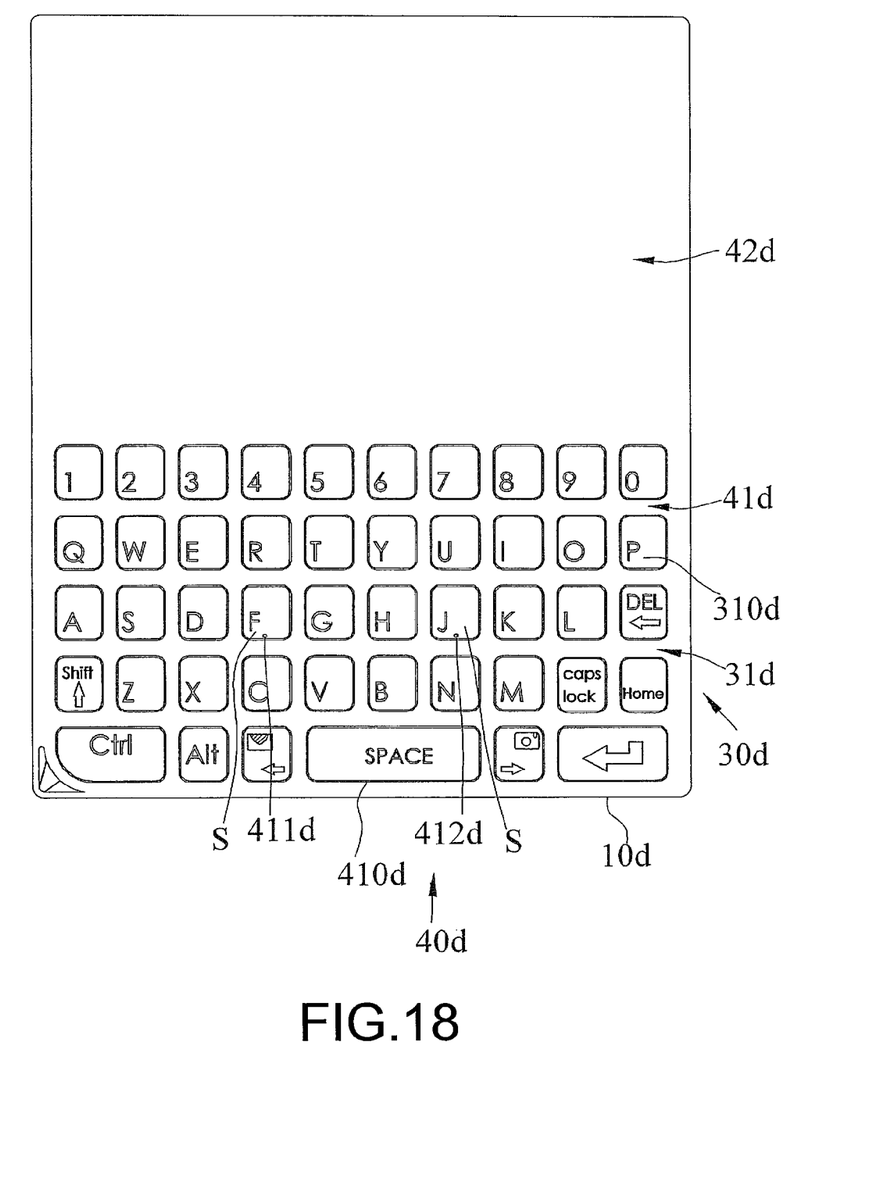

FIG. 8 to FIG. 10 are exploded view and front view illustrating the computer with an input device having a labeled region of the third embodiment, respectively. Referring to FIGS. 8 to 10, the difference between the computer with an input device having a labeled region of the third embodiment and that of the first embodiment is that: the cover 40b. The cover 40b is transparent, and a labeled region 41b is disposed on the surface of the cover 40b. The labeled region 41b makes the surface of the cover 40b uneven. The labeled region 41b includes a plurality of labelled portions 410b, and the number of the labelled portions 410b is equivalent to the number of the touch keys 310. Each of the labelled portions 410b is corresponding to one of the touch keys 310. The labelled portions 410b are bar-shaped protrusions, bar-shaped indentations, or combination of bar-shaped protrusions and bar-shaped indentations, which makes the user have different tactile feelings when touching. Two ends of the labelled portions 410b are in arc-shaped, or two ends of the labelled portions 410b are in straight-shaped. In the present embodiment, the labelled portions 410b are bar-shaped protrusions with two arc-shaped ends.

The labelled portions 410b are corresponding to the written characters displayed by the first monitor 20, and the user touches the labelled portions 410b to further distinguish positions of each of the touch keys 310.

A position S is formed above the bar-shaped labelled portions 410b, and a first bump 411b is disposed in the position S on the labelled portion 410b where the position S is corresponding to the specific touch key 310 which displays the character "F". Similarly, a second bump 412b is disposed in another position S on the another labelled portion 410b where the position S is corresponding to the specific touch key 310 which displays the character "J". From above, people skilled in the art know that the first bump 411b and the second bump 412b may also be disposed corresponding to other touch keys 310 analogously. The user then distinguishes positions of the touch keys 310 by the first bump 411b and the second bump 412b.

Identically, the written characters may be disposed in the position S directly, and therefore the labeled region 41b displays the written characters when the input device is power off.

FIG. 11 to FIG. 14 are schematic view, exploded view and front view illustrating the computer with an input device having a labeled region of the fourth embodiment, respectively. Referring to FIGS. 11 to 14, the computer with an input device having a labeled region of the fourth embodiment includes a host 10c, a first monitor 20c, a first touchpad 30c, a cover 40c, a second monitor 50c and a second touchpad 60c. A computing unit and software are installed in the host 10c. The first monitor 20c is electrically connected to the host 10c and serves as a display media of the host 10c, and the first touchpad 30c is electrically connected to the host 10c and serves as an input media of the host 10c. The first touchpad 30c includes a touch keypad region 31c, and the touch keypad region 31c includes a plurality of touch keys 310c.

The second monitor 50c is electrically connected to the host 10c and serves as the display media of the host 10c, and the second touchpad 60c is electrically connected to the host 10c and serves as the input media of the host 10c. The first monitor 20c and the second monitor 50c may be open or close relative to each other.

The host 10c, the first monitor 20c, the first touchpad 30c and the cover 40c are located on an almost the same lengthwise position, where in the first monitor 20c is stacked on the host 10c, the first touchpad 30c is stacked on the first monitor 20c, and the cover 40c is stacked on the first touchpad 30c. The host 10c may also be disposed on a lengthwise position the same as the lengthwise position of the second monitor 50c and the second touchpad 60c, wherein the second monitor 50c is stacked on the host 10c and the second touchpad 60c is stacked on the second monitor 50c. The host 10c may also be the host of the first monitor 20c or the host of the second monitor 50c. In the present embodiment the host 10c is disposed under the first monitor 20c.

The cover 40c encloses the first touchpad 30c and provides a function of protecting the first touchpad 30c. The cover 40c is transparent, and therefore cover 40c displays the written characters displayed by the first monitor 20c. A labeled region 41c is disposed on the surface of the cover 40c, and the labeled region 41c makes the surface of the cover 40c uneven. The labeled region 41c includes a plurality of labelled portions 410c, and the labelled portions 410c are indentations, protrusions, or combination of indentations and protrusions, which makes the user have different tactile feelings when touching. The number of the labelled portions 410c is equivalent to the number of the touch keys 310c. Each of the labelled portions 410c is corresponding to one of the touch keys 310c. The labelled portions 410c of the present embodiment are enclosed frames, and the enclosed-frame-shaped labelled portions 410c are indentations.

When the host 10c is power on, the first monitor 20c displays the written characters, and the labelled portions 410c of the labeled region 41c is corresponding to the touch keys 310c of the touch keypad region 31c of the first touchpad 30c. Each of the enclosed-frame-shaped labelled portions 410c of the present embodiment encircles one of the touch keys 310c of the touch keypad region 31c correspondingly. The user focuses on the written characters displayed on the first monitor 20c visually and touches the labeled region 41c of the cover 40c to further touch the touch keypad region 31c of the first touchpad 30c for data input. The user distinguishes positions of each of the touch keys 310c of the touch keypad region 31c by means of the labelled portions 410c of the labeled region 41c. A first bump 411c is disposed in one of the positions S on the labelled portion 410c where the position S is corresponding to the specific touch key 310c which displays the character "F". A second bump 412c is disposed in another one position S on the labelled portion 410c where the another one position S is corresponding to the specific touch key 310c which displays the character "J". The first bump 411c and the second bump 412c may be disposed on other touch keys 310c analogously. Then, the user distinguishes positions of the touch keys 310c by the first bump 411c and the second bump 412c rapidly.

In the situation that the input device is used to frequent input data, the user focuses on the display screen of the second monitor 50c instead of checking positions of the touch keys 310c repeatedly. Thus, the user ensures positions of the touch keys 310c by the physical labelled portions 410c of the labeled region 41c. In this way, velocity of data input is speeded up, and then request of rapid data input by user is further satisfied.

FIG. 15 to FIG. 18 are schematic view, exploded view and front view illustrating the computer with an input device having a labeled region of the fifth embodiment, respectively. Referring to FIGS. 15 to 18, the computer with an input device having a labeled region of the fifth embodiment includes a host 10d, a first monitor 20d, a first touchpad 30d and a cover 40d. A computing unit and software are installed in the host 10. The first monitor 20d is electrically connected to the host 10d and serves as the display media of the host 10d. The first touchpad 30d is electrically connected to the host 10d and serves as the input media of the host 10d. The first touchpad 30d includes a touch keypad region 31d including a plurality of touch keys 310d.

The cover 40d encloses the first touchpad 30d and provides a function of protecting the first touchpad 30d. The cover 40d is transparent and displays the written characters displayed by the first monitor 20d. A labeled region 41d and a plane region 42d are disposed on the surface of the cover 40d and divide the cover 40d into two portions. The labeled region 41d makes the surface of the cover 40d uneven, and the plane region 42d makes the surface of the cover 40d even. The labeled region 41d includes a plurality of labelled portions 410d, and the labelled portions 410d are indentations or protrusions. The number of the labelled portions 410d is equivalent to the number of the touch keys 310d, and each of the labelled portions 410d is corresponding to one of the touch keys 310d. The labelled portions 410d of the present embodiment are enclosed-frame-shaped indentations.

When the host 10d is power on, the first monitor 20d displays the written characters, and the labelled portions 410d of the labeled region 41d are corresponding to the touch keys 310d of the touch keypad region 31d of the first touchpad 30d. Each of the enclosed-frame-shaped labelled portions 410d of the present embodiment encircles one of the touch keys 310d of the touch keypad region 31d. The user focuses on the written characters displayed by the first monitor 20d visually and touches the labeled region 41d of the cover 40d to further touch the touch the keypad region 31d of the first touchpad 30d for data input. The user distinguishes positions of each of the touch keys 310d by the labelled portions 410d of the labeled region 41d. A first bump 411d is disposed in a position S on one of the labelled portions 410d where the position S is corresponding to the specific touch key 310d which displays the character "F".

Similarly, a second bump 412d is disposed in another position S on another one of the labelled portions 410d where the position S is corresponding to the specific touch key 310d which displays the character "J". The first bump 411d and the second bump 412d may also be disposed on other corresponding touch keys 310d. Then, the user distinguishes positions of specific touch keys 310d rapidly by the first bump 411d and the second bump 412d.

When the computer input device is used to frequent input data, the user may focus on other display screen of the first monitor 20d that is needed to be viewed instead of repeatedly checking positions of the touch keys 310. The user ensures positions of the touch keys 310d by the physical labelled portions 410d of the labeled region 41d. In this way, velocity of data input is speeded up, and request of rapid data input by user is further satisfied.

The host 10d, the first monitor 20d, the first touchpad 30d and the cover 40d of the embodiment are located on a same lengthwise position, wherein the first monitor 20d is stacked on the host 10d, the first touchpad 30d is stacked on the first monitor 20d, and the cover 40d is stacked on the first touchpad 30d.

From above description, the computer input device having a labeled region has at least following advantages:

1. The user can focus on other display screens needed to be viewed, display screen of the second monitor or other display screens of the first monitor that is needed to be viewed, instead of checking positions of the touch keys repeatedly when the computer input device is used to frequent input data. Therefore, the user can ensure positions of the touch keys by the physical labelled portions of the labeled region. In this way, velocity of data input is speeded up, and then request of rapid data input by user is further satisfied.

2. The user can distinguish positions of each of the touch keys of the touch keypad region by the labelled portions of the labeled region. In addition, a first bump is disposed in a position on one of the labelled portions where the position is corresponding to the specific touch key which displays the character "F". Similarly, a second bump is disposed in another position on another one of the labelled portions where the position is corresponding to the specific touch key which displays the character "J". The first bump and the second bump may also be disposed on other touch keys analogously. The user distinguishes positions of specific touch keys by means of the first bump and the second bump rapidly.

Although the disclosure is described with the embodiments above, the disclosure is not limited thereto. It will be apparent to those skilled in the art that various modifications and variations can be made to the structure of the disclosed embodiments without departing from the scope or spirit of the disclosure. Therefore, the scope of the disclosure is defined in the claims below.

What is claimed is:

1. A computer with an input device having a labeled region, comprises:
   a host, wherein a display is electrically connected the host;
   a first touchpad, electrically connected to the host and serving as an input media of the host, the first touchpad including a touch keypad region, wherein a plurality of touch keys are disposed in the touch keypad region;
   a cover, enclosing the first touchpad, the cover including a labeled region, wherein the labeled region is corresponding to the touch keypad region of the first touchpad, and the cover displays a plurality of written characters displayed by the display, and
   wherein when a user uses the touch keypad region to input data, the user distinguishes a position of each of the touch keys of the touch keypad region according to the labeled region.

2. The computer with an input device having a labeled region as claimed in claim 1, wherein the cover is non-transparent, and a plurality of written characters are disposed on the labeled region.

3. The computer with an input device having a labeled region as claimed in claim 1, wherein the display serves as a first monitor and is electrically connected to the host, and the first monitor serves as a display media of the host.

4. The computer with an input device having a labeled region as claimed in claim 3, wherein a plane region is disposed on a surface of the cover, and the labeled region and the plane region divide the cover into two portions, the surface of the cover where the labeled region disposed is uneven, while the surface of the cover where the plane region disposed is even.

5. The computer with an input device having a labeled region as claimed in claim 3, wherein the cover is transparent, and the cover displays a plurality of written characters displayed by the first monitor.

6. The computer with an input device having a labeled region as claimed in claim 3, wherein the host, the first touchpad and the cover are located on an almost the same lengthwise position, the first monitor is stacked on the host, the first touchpad is stacked on the first monitor, and the cover is stacked on the first touchpad.

7. The computer with an input device having a labeled region as claimed in claim 1, wherein the labeled region includes a plurality of labelled portions, a number of the labelled portions is equivalent to a number of the touch keys, and each of the labelled portions is corresponded to one of the touch keys.

8. The computer with an input device having a labeled region as claimed in claim 7, wherein the labelled portions are indentations, protrusions, enclosed frames, bar-shaped protrusions or bar-shaped indentations.

9. The computer with an input device having a labeled region as claimed in claim 7, wherein the labelled portions are bar-shaped protrusions, and two ends of the bar-shaped protrusions are in arc-shaped or in straight-shaped.

10. The computer with an input device having a labeled region as claimed in claim 7, wherein the labelled portions are bar-shaped indentations, and two ends of the bar-shaped protrusions are in arc-shaped or in straight-shaped.

11. The computer with an input device having a labeled region as claimed in claim 7, wherein a first bump is disposed in a first position of the labelled portions corresponding to a specific written character, a second bump is disposed in a second position of the labelled portions corresponding to another specific written character, and the user distinguishes positions of the specific touch keys by means of the first bump and the second bump rapidly.

12. The computer with an input device having a labeled region as claimed in claim 1, wherein the host, the first touchpad and the cover are located on a same lengthwise position, and the cover is stacked on the first touchpad.

* * * * *